2,868,690

PROPARGYL BARBITURATES

Gustav J. Martin, Philadelphia, Souren Avakian, Oreland, and Andrew E. Gal, Philadelphia, Pa., assignors to The National Drug Company, Philadelphia, Pa., a corporation of Delaware No Drawing. Application February 19, 1957
Serial No. 641,036

5 Claims. (Cl. 167—52)

This invention relates to and has for its object the provision of therapeutic agents which may be used as CNS depressants; because of their sedative-hypnotic effectiveness they may be used to induce sleep if pain is absent, or to control convulsions. The invention is also concerned with the method of preparing these agents and with combinations of them with other medicinals to obtain a potentiated effect.

The novel compounds of the invention are barbituric acid derivatives which are substituted in the 5-position by both propargyl and 1-methyl butyl substituents. More specifically, the novel compounds of the invention are 5-propargyl-5 (1-methyl butyl) barbituric acid and the homologous 5-propargyl-5 (1-methyl butyl)-1-methyl barbituric acid.

The 5-propargyl-5-(1-methyl butyl) barbituric acid may be prepared by adding diethyl (1-methyl butyl) malonate to a sodium ethoxide solution to form the sodium salt, heating the salt at reflux temperature after adding propargyl bromide, then separating the diethyl (1-methyl butyl) propargyl malonate which is formed. The malonate and urea are then refluxed in sodium ethoxide solution and the barbituric acid derivative formed is separated from the reaction mixture. The compound may be formed alternatively by reacting 5-(1-methyl butyl) barbituric acid with propargyl bromide. The homologous 1-methyl derivative may be prepared by alkylating the 5-propargyl-5 (1-methyl butyl) barbituric acid with dimethyl sulfate; or alkyl halides, such as methyl bromide, methyl iodide, etc.; or by condensing diethyl (1-methyl butyl) propargyl malonate with N-methyl urea under reflux in sodium ethoxide solution.

The novel compounds of the invention may be administered orally or by injection. When orally administered alone, dosages of about 25–150 mg. are used depending on the desired effect; when used by injection, smaller amounts, particularly those from about 50–100 mg. quantities may be used. Usage in combination with other medicinals (the latter in established dosages) may require smaller dosages of the barbiturates and quantities of 25–50 or more mg. are effective.

The compounds of the invention may be compounded to produce the standard dosage unit forms such as tablets, capsules, elixirs, etc. When tablets are formed, they may, of course, be scored to provide for administration of fractional dosages. For example, a tablet containing 50 mg. of active ingredient may be scored so that the patient can take 25 mg. portions at different times.

Following are specific working examples which characterize the invention:

EXAMPLE 1

5-(1-methylbutyl)-5-propargyl barbituric acid (A) Diethyl (1-methylbutyl) propargyl malonate.—A sodium ethoxide solution is prepared by adding 11.5 g. sodium to 150 ml. anhydrous ethanol. About 110 g. diethyl (1-methylbutyl) malonate is added to form the sodium salt of the malonic acid, then 59.5 g. propargyl bromide is added to the salt solution and the mixture is refluxed for 8 hours. To the cold reaction mixture, 500 ml. water is added. The upper layer of diethyl (1-methylbutyl) propargyl malonate is separated and distilled under diminished pressure. The diethyl (1-methylbutyl) propargyl malonate collected as the distillate which separates at 105–108°/2 mm.

(B) 5-(1-methylbutyl)-5-propargyl barbituric acid.—A sodium ethoxide solution is prepared by adding 46 g. sodium to 600 ml. anhydrous ethanol. After adding 60 g. urea and 134 g. diethyl (1-methylbutyl) propargyl malonate to the sodium ethoxide solution, the mixture is refluxed for 18 hours. The ethanol is then separated under reduced pressure and the residue is added to 800 g. ice. The aqueous mixture which is formed is extracted several times with ethyl ether and the aqueous solution then acidified (using Congo blue as the indicator) with 3 N hydrochloric acid. The barbituric acid which separates is extracted with ethyl ether. After distillation of the ether, the remaining barbituric acid is recrystallized from aqueous ethanol to obtain the purified 5-(1-methylbutyl)-5-propargyl barbituric acid (M. P. 140–142°).

(C) 5-(1-methylbutyl)-5-propargyl barbituric acid, alternate method.—30 g. 5-(1-methylbutyl) barbituric acid in 200 ml. ethanol is neutralized with 60 ml. 2.5 N NaOH solution. Then 6 ml. 10% $CuSO_4$ solution is added together with 24 g. propargylbromide. The mixture is refluxed for 18 hours after which the ethanol and water are separated by distillation at reduced pressure; the 5-(1-methylbutyl)5-propargyl barbituric acid which precipitates is separated by filtration and then washed with Skellysolve B. Recrystallation from ethanol yields about 20 g. 5-(1-methylbutyl)-5-propargyl barbituric acid (M. P. 140–142°).

Analysis for $C_{12}H_{16}O_3N_2$: Percent N (calc.) 11.86%. Percent N (found) 11.65%.

EXAMPLE 2

5-(1-methylbutyl)-5-propargyl-1-methyl barbituric acid 8 g. 5-propargyl-5-(1-methylbutyl) barbituric acid is dissolved at 0° in 100 ml. 1 N NaOH. Then 4.3 g. dimethylsulfate is added. The temperature of the mixture is allowed to rise and, in 5 hours reaches 20° C. The solution is then acidified with 33 ml. 3 N HCl and the material which precipitates is extracted several times with ethyl ether, and the ether is thereupon removed and the residue is taken up in cold 1 N NaOH solution. The resulting solution is washed once with ethyl ether and then acidified with a 2 N HCl solution to approximately pH 3. The resulting oil is separated from the aqueous solution by ethyl ether extraction and the combined ether extracts are washed with 50 ml. 2 N $NaHCO_3$ solution then extracted several times with cold 2 N NaOH solution. Upon acidification 5.7 g. crude compound is obtianed. This material is crystallized from ethanol-water to yield the purified 5-(1-methylbutyl)-5-propargyl-1-methyl barbituric acid (M. P. 116–117° C.).

Analysis for $C_{13}H_{18}O_2N_2$: Percent N (calc.) 11.19%. Percent N (found) 11.20%.

ALTERNATE METHOD

A sodium ethoxide solution is prepared by adding 46 g. sodium to 600 ml. anhydrous ethanol. After adding 74 g. N-methyl urea and 129 g. diethyl-(1-methylbutyl) propargyl malonate to the sodium ethoxide solution, the mixture was heated under reflux for 20 hours. The ethanol is then removed under reduced pressure and the residue is added to 800 ml. ice. The aqueous mixture which is formed is extracted several times with ethyl ether, and the aqueous solution is then acidified (using Congo-red as the indicator) with 3 N hydrochloric acid. The barbituric acid which separates was extracted with ethyl ether. After distillation of the ether the remaining barbituric acid is recrystallized from aqueous ethanol to obtain the purified 5-(1-methylbutyl)-5-propargyl-1-methyl barbituric acid (M. P. 116–117° C.).

The following examples are characteristic of the compositions which contain 5-propargyl-5-(1-methylbutyl) barbituric acid or the homologous 5-propargyl-5-(1-methylbutyl)-1-methyl barbituric acid, as well as allylbenzylacetamide for enhanced effect. The combination of the barbiturates of the invention with allylbenzylacetamide has been found to enhance the effect of the barbiturates.

EXAMPLE 3

50 mg. 5-propargyl-5-(1-methylbutyl) barbituric acid is mixed with 100 mg. lactose and 5 mg. starch. The mix is granulated with acacia mucilage, dried, and screened. 5 mg. magnesium stearate is added and the granulation is compressed into a tablet.

EXAMPLE 4

50 mg 5-propargyl-5-(1-methylbutyl)-1-methyl barbituric acid is mixed with 100 mg. lactose, and the mixture is filled into a hard gelatin capsule.

EXAMPLE 5

10 mg. 5-propargyl-5-(1-methylbutyl) barbituric acid is dissolved in 125 ml. ethanol. To this solution are added 450 ml. glycerin, 150 ml. simple syrup, 30 ml. sweet orange peel tincture, 2 ml. amaranth solution, and enough distilled water to make 1000 ml. Each 5 ml. of this elixir contains 50 mg. 5-propargyl-5-(1-methylbutyl) barbituric acid.

EXAMPLE 6

25 mg. 5-propargyl-5-(1-methylbutyl) barbituric acid and 250 mg. allylbenzylacetamide are intimately mixed with 100 mg. lactose and filled into a hard gelatin capsule.

As has been indicated above, the barbiturates of the invention (with or without allylbenzylacetamide) may be compounded in any of the standard dosage unit forms. Thus, for example, they may be tableted to contain the usual excipients, fillers, dyestuffs, etc. As fillers, one may use starch, powdered cane sugar, lactose, etc.; and as binding agents one may use, inter alia, gum acacia, gelatin or corn syrup. Lubricants, such as calcium or magnesium stearate, mineral oil, Carbowax or hydrogenated vegetable oils; and disintegrating agents such as corn syrup or potato starch may also be used. In practice dry granulations are made containing the active ingredient, filler, binder and (if desired) dyestuffs. This mixture is then compressed (e. g. in the standard single punch or rotary multiple punch machines or in hand machines) to obtain the desired tablets. To prepare the granulations for tabletting, one usually uses the "wet method" which includes milling and mixing the active ingredients (and coloring materials if they are used), wet mixing the milled material with a solution of binding agent, screening the wet mass to pea size, drying, then dry screening. At this stage the granulations may be blended with small quantities of other ingredients which may be heat sensitive or relatively unstable. Thus, lubricants or disintegrating agents (corn syrup or potato starch) may be added at this stage. Scoring may be effected during the pressing operation; and, if desired, a coating may then be applied in accordance with standard methods to mask the taste.

The compositions of the invention may also be prepared in capsule form, preferably as hard capsules (made of gelatin and water and molded in two sections). In preparing the capsules the granulations are prepared as described above for the preparation of tablets then filled in accordance with standard procedures. The compositions of the invention may also be prepared in suspension form or in solution, e. g. in a mixture of water, alcohol, and glycerin.

The compounds and compositions of the invention have been found to be extremely effective hypnotics. Likewise, high anticonvulsant activity is indicated even at low dosage levels. In determining anticonvulsant activity in mice, convulsions are normally induced by administration of Metrazol, administered by the I. P. route at a level of either 100 mg./kg. or 200 mg./kg. Using this method, it has been found that administration of 10 mg./kg. 5-propargyl-5-(1-methylbutyl) barbituric acid orally protects mice 100% against 100 mg./kg. Metrazol. At the 30 mg./kg. level, the barbiturates of the invention show 100% protection when 100 mg./kg. Metrazol is used and 80% when 200 mg./kg. Metrazol is used. On the other hand, when comparable tests were carried out using the prior art, sodium phenobarbital 10 mg./kg. administered orally gave no protection and 30 mg./kg., given orally, was similarly ineffective. Pentobarbital was likewise of little value.

This invention may be variously otherwise embodied within the scope of the appended claims.

We claim:

1. A compound of the formula

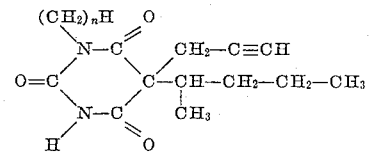

wherein $n$ is an integer from 0 to 1, both inclusive.

2. A pharmaceutical composition comprising (1) a compound of the formula

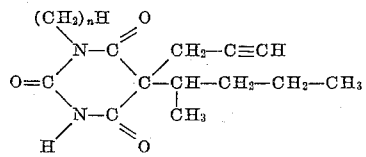

wherein $n$ is an integer from 0 to 1 both inclusive and (2) an inert pharmaceutical carrier.

3. A composition of claim 1 wherein $n$ is 0.

4. A composition of claim 1 wherein $n$ is 1.

5. A composition consisting essentially of (1), a compound of claim 1, (2) allylbenzylacetamide.

References Cited in the file of this patent

UNITED STATES PATENTS 1,682,062    Bockmuhl et al. _____ Aug. 28, 1928

OTHER REFERENCES

Shorle et al.: Jour. Amer. Chem. Soc., 55, 4649–52 (1933).